United States Patent
Schönebeck

(10) Patent No.: US 8,498,859 B2
(45) Date of Patent: Jul. 30, 2013

(54) VOICE PROCESSING SYSTEM, METHOD FOR ALLOCATING ACOUSTIC AND/OR WRITTEN CHARACTER STRINGS TO WORDS OR LEXICAL ENTRIES

(76) Inventor: Bernd Schönebeck, Aachen (DE)

( * ) Notice: Subject to any disclaimer, the term of this patent is extended or adjusted under 35 U.S.C. 154(b) by 1100 days.

(21) Appl. No.: 10/534,658

(22) PCT Filed: Nov. 12, 2003

(86) PCT No.: PCT/EP03/12639
§ 371 (c)(1),
(2), (4) Date: Oct. 14, 2005

(87) PCT Pub. No.: WO2004/044888
PCT Pub. Date: May 27, 2004

(65) Prior Publication Data
US 2006/0100851 A1 May 11, 2006

Related U.S. Application Data

(60) Provisional application No. 60/425,856, filed on Nov. 13, 2002.

(51) Int. Cl.
| | |
|---|---|
| G06F 17/27 | (2006.01) |
| G06F 15/18 | (2006.01) |
| G10L 15/00 | (2006.01) |
| G10L 15/04 | (2006.01) |
| G10L 15/18 | (2006.01) |
| G10L 21/00 | (2006.01) |
| G06N 3/02 | (2006.01) |
| G06N 5/00 | (2006.01) |

(52) U.S. Cl.
USPC ............... 704/9; 704/231; 704/251; 704/254; 704/257; 704/270; 704/275; 706/1; 706/12; 706/15; 706/45; 706/62

(58) Field of Classification Search
USPC ... 704/231, 251, 257, 270, 275, 9, 254; 9/231
See application file for complete search history.

(56) References Cited

U.S. PATENT DOCUMENTS 4,725,956 A * 2/1988 Jenkins ............................ 701/2
4,972,485 A * 11/1990 Dautrich et al. .............. 704/251

(Continued)

FOREIGN PATENT DOCUMENTS

| DE | 19715099 | 10/1998 |
|---|---|---|
| DE | 10050808 | 5/2002 |

(Continued)

OTHER PUBLICATIONS

Asher, N. and A. Lascarides (1995) 'Lexical Disam—biguation in a Discourse Context', Journal of Se-mantics, voi.12.1, 69-108.*

(Continued)

Primary Examiner — Paras D Shah
(74) Attorney, Agent, or Firm — Donald R. Boys; Central Coast Patent Agency, Inc.

(57) ABSTRACT

A language-processing system has an input for language in text or audio, as a message, an extractor operating to separate words and phrases from the input, to consult a knowledge base, and to assign a concept to individual ones of the words or phrases, and a connector operating to link the concepts to form a statement. In some cases there is a situation model updated as language is processed. The system may be used for controlling technical systems, such as robotic systems.

25 Claims, 2 Drawing Sheets

U.S. PATENT DOCUMENTS

| | | | |
|---|---|---|---|
| 5,638,487 A * | 6/1997 | Chigier | 704/253 |
| 5,715,468 A * | 2/1998 | Budzinski | 704/9 |
| 5,774,860 A * | 6/1998 | Bayya et al. | 704/275 |
| 6,044,322 A * | 3/2000 | Stieler | 701/120 |
| 6,178,398 B1 * | 1/2001 | Peterson et al. | 704/232 |
| 6,208,972 B1 * | 3/2001 | Grant et al. | 704/275 |
| 6,243,670 B1 * | 6/2001 | Bessho et al. | 704/9 |
| 6,246,977 B1 * | 6/2001 | Messerly et al. | 704/9 |
| 6,567,778 B1 * | 5/2003 | Chao Chang et al. | 704/257 |
| 6,604,094 B1 * | 8/2003 | Harris | 706/48 |
| 6,871,199 B1 * | 3/2005 | Binnig et al. | 707/5 |
| 7,003,459 B1 * | 2/2006 | Gorin et al. | 704/275 |
| 7,089,218 B1 * | 8/2006 | Visel | 706/14 |
| 7,174,300 B2 * | 2/2007 | Bush | 704/275 |
| 7,305,345 B2 * | 12/2007 | Bares et al. | 704/275 |
| 7,337,157 B2 * | 2/2008 | Bridges et al. | 706/45 |
| 7,363,213 B2 * | 4/2008 | Polanyi et al. | 704/9 |
| 7,383,169 B1 * | 6/2008 | Vanderwende et al. | 704/9 |
| 7,403,890 B2 * | 7/2008 | Roushar | 704/9 |
| 2001/0021909 A1 * | 9/2001 | Shimomura et al. | 704/275 |
| 2001/0041980 A1 * | 11/2001 | Howard et al. | 704/270 |
| 2002/0077825 A1 * | 6/2002 | Silverman et al. | 704/270 |
| 2002/0107694 A1 * | 8/2002 | Lerg | 704/273 |
| 2002/0133355 A1 | 9/2002 | Ross et al. | |
| 2002/0178005 A1 * | 11/2002 | Dusan et al. | 704/254 |
| 2002/0198714 A1 * | 12/2002 | Zhou | 704/252 |
| 2003/0144832 A1 * | 7/2003 | Harris | 704/10 |

FOREIGN PATENT DOCUMENTS

| | | |
|---|---|---|
| DE | 10051794 | 5/2002 |
| FR | 2821972 | 9/2002 |
| WO | WO 0191110 | 11/2001 |
| WO | WO0231813 | 5/2002 |

OTHER PUBLICATIONS

Zickus, Wendy M., Kathleen F. McCoy, Patrick W. Demasco, and Christopher A. Pennington. 1995. A lexical database for intelligent AAC systems. In Anthony Langton, editor, Proceedings of the RESNA '95 Annual Conference, pp. 124-126, Arlington, VA. RESNA Press.*

Porzel R. and I. Gurevych (2003). "Contextual Coherence in Natural Language Processing," Modeling and using Context: In Proceedings of the Context 2003. pp. 272-285.*

Allen, J., Ferguson, G., 2000: Rochester University NY Dept of Computer Science. A Dialogue-Based Approach to Mixed-Initiative Plan Management, http://oai.dtic.mil/oai/oai?verb=getRecord&metadataPrefix=html&identifier=ADA386564.*

U.S. Appl. No. 60/425,856, filed Nov. 13, 2002, Schönebeck, Bernd. Mast et al., A Speech Understanding and Dialog System with a Homogeneous Linguistic Knowledge Base, IEEE Transactions on Pattern Analysis and Machine Intelligence, Feb. 16, 1994, pp. 179-193, No. 2, New York, US.

* cited by examiner

VOICE PROCESSING SYSTEM, METHOD FOR ALLOCATING ACOUSTIC AND/OR WRITTEN CHARACTER STRINGS TO WORDS OR LEXICAL ENTRIES

CROSS-REFERENCE TO RELATED DOCUMENTS

The present applications claims the benefit of the filing date of U.S. Provisional Patent Application 60/425,856, filed Nov. 13, 2002.

BACKGROUND OF THE INVENTION

The present invention relates to a method for the automatic ascertainment and further processing of the meaning of verbally provided information. The meaning of verbal messages is reconstructed by the system on the basis of procedures that simulate the elements of the human process of understanding language. Logically false and meaningless statements are identified. For ambiguous statements, a clear interpretation is generated as a function of the current context (a context-bound removal of ambiguity). In the course of ascertaining the meaning, a situation model is constructed and is continuously updated. Conflicts arising between the current situation (or the current condition of a system being controlled) and the meaning of the verbal inputs are detected and are reported to the user. Specific expert knowledge can optionally be employed for an expanded risk analysis.

The consequences of the actions and events contained in the verbal messages (or control commands) are anticipated by the system and are checked in the context of a virtual realization. On the basis of the virtual realization, the meaning of the verbal input is converted into control commands for downstream technical systems/robots.

An example of a voice-recognition system is familiar from DE 100 51 794 A1, which remains, however, at the level of a simple tabular assignment, without realizing meaning-based processing. The language-processing systems that are disclosed in DE 100 50 808 A1 and in DE 197 15 099 A1 advance a little further but are nevertheless limited to very narrow technical areas and for this reason can also operate without meaning recognition. In addition, in these cases, before being lexically assigned, the language input is already subject to a filter, so that no free, conceptual ascertainment of the verbal meaning takes place independently of the specific context. In particular, the systems do not operate on a conceptual level, but rather they assemble a reaction from a simple grammatical link of stored commands, or from a syntactic link that has already been input.

BRIEF DESCRIPTION OF THE DRAWING FIGURES

DETAILED DESCRIPTION OF THE INVENTION

Figure 1:
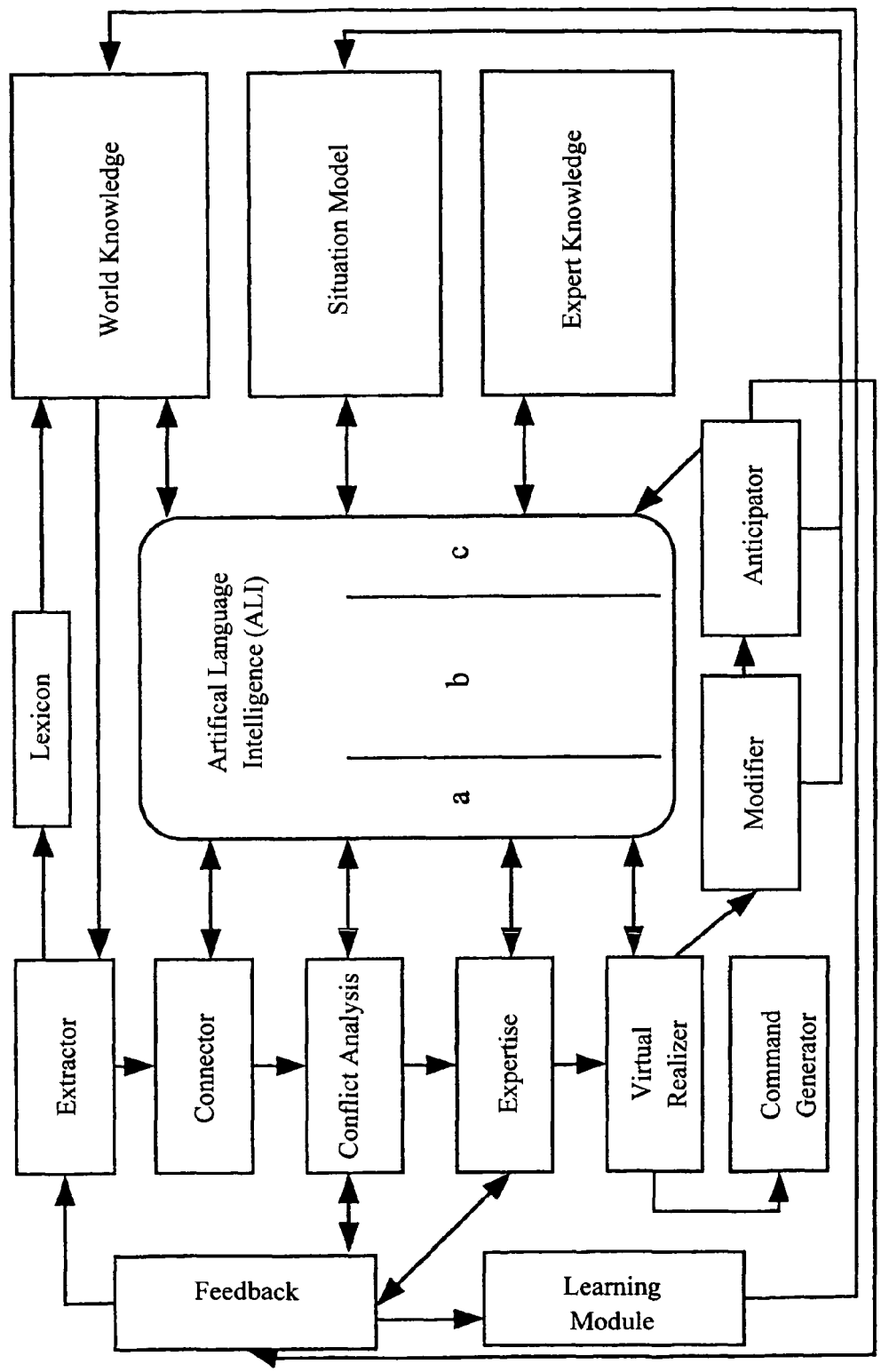
FIG. 1 is an architecture diagram of elements of the invention in one embodiment.

In contrast to the current, statistical methods for language processing, the system described here does not analyze the probability of occurrence of acoustic sequences (spoken language) or character strings (written language), but rather it extracts and processes the conceptual meaning of verbal messages. Therefore, all the core procedures and knowledge bases of the system operate independent of a specific language. To process the input of a given national language, it is only necessary to add the respective language-specific lexicon.

The idea rests on the innovative concept of Cognitive Ergonomic Systems (CES). CES for the first time assures the understanding of textual/verbal information using technical systems and makes it possible to automatically ascertain the meaning of verbally provided information. In contrast to conventional methods, which rely on the statistical evaluation of character strings, the Cognitive Economic System reconstructs the meaning of verbal messages and ascertains their meaning. Through ascertaining meaning, CES is capable both of distinguishing logically false statements from true ones as well as of drawing conclusions regarding the possible consequences of actions and events. These innovative performance features of CES make possible multiple application possibilities in various areas, and they make it possible:

to construct dialog and information systems, which process inputs that are themselves false or syntactically/grammatically incomplete, comprehend customer intentions online, and independently provide alternative product options;

to qualitatively improve the available tools for knowledge management, in order to achieve an automatic evaluation of the relevance of new information in accordance with user-specific criteria;

to verbally control technical systems and robots, coupled to excellent safety standards through reaching predictive conclusions regarding the consequences of actions;

to support flight and taxiway monitoring both in the air as well as on the ground.

The exceptional performance of CES relies on the simulation of cognitive processes that underlie the manner in which humans understand language.

The core system of CES is made up of an intelligence module and a conceptual knowledge base. The meaning of natural-language information is ascertained using the knowledge base, and it is interpreted by the intelligence module. Further modules act to remove the ambiguity from ambiguous statements, to check any consequences of actions, and to construct a current situation model. Through the interplay of the knowledge base and the intelligence module, basic mechanisms and performance characteristics of human thought are imitated, such as:

1. The ascertainment of meaning of natural-language information, including
   recognizing meaningful statements even in statements that are syntactically/grammatically incomplete or false
   identifying/rejecting meaningless statements
   identifying/rejecting logically false statements.
2. Inferential thinking, including
   recognizing and logically realizing the consequences of actions
   making predictive inferences regarding future consequences of actions.

The distinction must be made between recognizing and comprehending language. Whereas speech recognition only performs the function of filtering the verbal sound sequences from environmental noises, language comprehension includes ascertaining the meaning. For example, an unfamiliar foreign language can be identified as a language, but it cannot be understood.

The Cognitive Ergonomic System (CES) ascertains the meaning of the concepts contained in verbally provided information and thus in principle differs from the mathematical/statistical analyses of characters or letter strings commonly used nowadays in the area of natural language processing (NLP), which is mostly based on the Bayes-Theorem or Hidden-Markov Models. By linking and combining the concepts contained in the natural-language input according to the rules of human thought, CES reconstructs the meaning of the verbal message. Grounded in a conceptual knowledge base, the system subsequently checks the meaningfulness of the reconstructed statement. In this way, it is possible to evaluate the language input in accordance with both logical criteria (correct/false) as well as content-based criteria (relevant/irrelevant.). These innovative performance characteristics make possible multiple applications in various areas.

Knowledge Management

"We live in an information society," is an oft-made statement reflecting the spirit of the times. With the introduction of microcomputers and PCs, it has become possible, and over time it has become necessary, to process/exploit large quantities of information: "a systematic procedure for structuring, documenting, and exploiting knowledge is vital for the survival even of small companies, . . . as it becomes increasingly more difficult in a time of information glut to distinguish market-relevant knowledge from irrelevant information" (Antoni, Sommerlatte (publishers), in "Knowledge Management Report").

Thus intelligence systems are required that automatically process texts and evaluate them with regard to their relevance. Systems of this type must be capable of ascertaining the meaning of the incoming information. Only once information has been understood can it be compared with the existing previous knowledge and its relevance then be evaluated for the user on the basis of user-specific criteria. Using the systems currently available on the market, relevance is evaluated on the basis of the frequency of occurrence/probability of occurrence of the sought-after patterns, i.e., of character strings or sequences of letters. The meaning that is conveyed by the character strings or words is not grasped, which makes it impossible to include user-specific knowledge in the evaluation of relevance.

Within its expert knowledge module, CES has special slots for implementing user-specific knowledge. For the automatic relevance assessment, the meaning of the new information is first extracted, it is then compared with the content of the existing knowledge base, and finally a relevance evaluation is derived by the intelligence module on the basis of the expert knowledge in accordance with user-specific criteria.

Speech Recognition/Writing Recognition

Technical systems for recognizing spoken language are already available on the market from various suppliers. For example, one application provides for the automatic conversion of spoken language into written language. Thus the user can input a letter not only via the keyboard but can also dictate it to his computer. The basic principle is the direct conversion of received sound patterns into character strings, the correct spelling of familiar words being assured by a knowledge base (internal lexicon).

Despite high technical standards, the quantity of errors in acoustical recognition is still considerable—caused by acoustical disturbance factors (individually varying or unclear pronunciation, dialects, background noises). Paradoxically, the susceptibility to error in the systems increases as the knowledge base, or lexicon, becomes larger. As a result of acoustical sources of disturbance, it is possible to activate false lexical inputs, for example, "cashier" [Kasse] or "pocket" [Tasche] instead of "cup" [Tasse]. The result can be meaningless statements such as "She drank two cashiers [Kassen] of coffee," instead of "She drank two cups of coffee." Because the systems currently available on the market do not grasp the meaning of language statements, these errors cannot be detected. The attempt is made to exclude errors of this type through statistical calculations. Thus in wide-ranging practice texts, it can be calculated that the probability of the letter sequence "cups [Tassen] of coffee" is generally larger than "cashiers [Kassen] of coffee." Based on these probability values, the second interpretation could be discarded as less probable. The weaknesses of this approach are obvious; it

- can only be used on combinations of letter sequences that are already contained in the "practice texts,"
- cannot meaningfully distinguish between alternatives that have similar probability values,
- results in problems in the case of letter strings that are correct in their content but that occur with only minimal probability,
- is only marginally effective for online language analysis due to the high calculation costs, etc.

Contemporary acoustical speech recognizers in the most favorable environmental conditions are capable of grasping verbal sound sequences and distinguishing them from irrelevant noises. However, it is only the sound and not the meaning of the verbal messages that can be grasped. This results in a susceptibility to errors, or an ambiguity of voice recognition, when speakers change or in response to an unfavorable signal/noise ratio. On the other hand, when several acoustically possible alternatives are available, meaning recognition realized through CES allows for selecting the word from the lexicon that fits the content, thus avoiding errors. A learning phase with extensive practice texts is unnecessary, as are expensive statistical online analyses. Using the intelligence module, it is possible to process any combinations (i.e., even those occurring for the first time) of all concepts contained in the lexicon. Using CES, it is possible for the first time to verify semantics and content and to correct the analysis undertaken by acoustical speech recognizers.

Dialog Systems & Customer Relationship Management

For the design of efficient and powerful dialog systems, the above-mentioned performance characteristics of CES form an excellent foundation from the area of voice recognition and knowledge management. The linking of both components results in synergy effects, which make it possible, inter alia, to recognize the purposes and intentions of customers during a dialog. This is now demonstrated in the case of a search engine, representing the simplest case of a dialog system.

Assume a user is searching for "goldfish" and "guppy." CES on its own would extend (or limit) the search to all ornamental fish, and, if necessary, it would initiate a search for ornamental fish dealers, etc. The system would provide a user who is searching for "mackerel" and "halibut" with the category of edible fish, or it might suggest a search for seafood restaurants. In contrast to the products available on the market, CES does not require any further information regarding the user but rather infers the specific intention "edible fish" versus "ornamental fish" solely on the basis of the search words provided, with the assistance of the intelligence module.

In contrast to currently available systems, dialog systems furnished with CES are capable of interpreting inputs that are incompletely recognized acoustically or are syntactically/grammatically erroneous. Furthermore, CES makes it possible, without specific prior knowledge of a customer, to derive their intentions online solely from a content-based analysis of the query, and thus to automatically provide alternative product offerings.

System and Robot Controls Using Speech Inputs

Whereas in the above-mentioned areas, the performance of currently available commercial systems is qualitatively improved with CES, in the area of language control the systems have yet to appear on the market that are able to stand up to practice. Among other things, this is due mainly to the fact that usually individual keywords are employed that have to be separated from the natural-language statement to control technical systems through speech. As a control signal, the acoustical pattern of the verbal statement and not its meaning is used.

Only when CES is employed is it possible to use the content-based meaning of natural-language statements in order to control technical systems. Through CES, ambiguous statements are made unambiguous in a context-sensitive manner. Thus the statement "polish the tool" is accepted as an action instruction; on the other hand, "polish the recruit," depending on the scope of the knowledge base, is understood either as a metaphor or is rejected as a meaningless statement.

Robots, or technical systems, are empowered to analyze the verbal input in accordance with logical and content-based criteria (correct/false, meaningful/meaningless). It is at the end of the analysis that there is a clear interpretation of the verbal input. At the same time, flexibility in language control is increased. The system is empowered to reconstruct meaningful commands even from word combinations (synonyms, paraphrases) that had not previously been explicitly learned.

Because CES recognizes the consequences of actions and is equipped with the capacity for predictive inference regarding future consequences of actions, the user can be notified regarding safety risks before actions or control interventions are executed. Alternatively, specific consequences of actions can a posteriori be classified in the knowledge base as illegal. This can be used for an automatic situation-specific blocking of actions or control interventions.

A further field of application relates to the area of "accessibility," i.e., the creation of access for disabled persons. Aids of this type are mandatory in software that is approved for distribution in the USA, whereas in the European Union corresponding guidelines are in preparation. This requirement can be satisfied by implementing a module for language control.

"semantic WEB"

Internet web sites are created by human beings for human beings, i.e., they presuppose a human information processing capacity. Therefore, when they are processed automatically by machine, problems arise. The approach developed at the Massachusetts Institute of Technology (MIT) under the slogan "semantic WEB" provides for the future coding of all Internet web sites in doubled fashion. In addition to the visible web site for humans, information contained in it will also be simultaneously available in a code that can be read by machine. This approach will only successful when all future Internet providers accept a doubling of their labor costs for Internet presentations and code their web sites twice. In connection with CES, the currently available technical systems ("spiders," search engines, inter alia) are empowered to undertake automatic ascertainment, cataloging, search, and evaluation of information in the Internet directly on the basis of available natural-language information (the text sites).

The combination of existing Internet tools along with innovative CES technology makes it possible to realize the idea of the "semantic WEB" without the additional expense that would otherwise be necessary in configuring Internet presentations.

The NLP systems currently available on the market rely on probability calculations regarding the common occurrence of sequences of letters or character strings. However, the meaning of the analyzed character strings cannot be ascertained or described thereby. In contrast thereto, CES ascertains the meaning of verbal messages, including the consequences of actions and events. This takes place in three global processing steps.

Meaning reconstruction: all concepts of a statement are meaningfully linked

Conflict analysis: Checking as to whether
a) the reconstructed meaning is appropriate to the current situation
b) undesirable secondary/side effects arise.

Realization: the statement and its consequences are converted virtually (or in reality, through a connected technical system).

CES is capable of comprehending combinations of words that have not previously been learned—the relationships between the words of a verbal input are not stored in the knowledge base but rather are generated online by the intelligence module using cognitive procedures. Therefore, the knowledge base of CES is in the highest degree economical (extremely small memory requirements: approximately 1 MB for 7,000 concepts) and flexible—any combinations of all the words contained in the lexicon can be analyzed. Each new entry (word or concept) is integrated in the knowledge base and automatically improves its structure and capacity. In other words, CES grasps and evaluates natural-language information by simulating human language comprehension.

The Cognitive Ergonomic System (CES) is designed in modular fashion (FIG. 1). It is made up of a series of processing modules (extractor, connector, conflict analysis, expertise, virtual realizer including modifier and anticipator, and, if appropriate, a command generator) and data maintenance modules (world knowledge, situation model, expert knowledge, lexicon). Built into CES are a feedback module and a learning module. The processing modules assure the reconstruction and further processing of the content-based meaning of a verbally provided input and, if appropriate, its conversion into executable control commands for downstream technical installations or robots.

A verbal input can occur in the form of acoustical patterns (oral language) or character strings (written language). CES operates on the level of concepts, i.e., with the information that stands behind the acoustical or written character strings. Access to the conceptual meaning of the verbal input is achieved via an appropriate lexicon, which contains the above-mentioned character strings.

The necessary conceptual background knowledge is made available by three data maintenance modules—world knowledge, situation model, and expert knowledge. The world knowledge module contains a minimum of general knowledge that is necessary for the concrete application. This knowledge is represented by various categories, such as events (e.g., cooking, legal proceeding), objects (stove, judge), references (with, in case, over), number words, etc.

In the expert knowledge module (optional knowledge base), it is possible, if required, to store special background knowledge (e.g., the physical operational mechanism of a microwave, special legal rules such as the Shop Closing Act, etc.).

The situation model module is generated by CES in the course of the processing. It contains information regarding the current situation context (the meaning of the previously provided language information accumulates, as well as, in the case of a downstream technical installation, its current system condition). At the termination/interruption of the processing session, the information contained in the situation model can be stored and reloaded later if necessary.

All three data maintenance modules exploit the research results of the cognitive sciences (brain research, cognitive psychology, artificial intelligence) and follow the principles of knowledge presentation in human memory.

The artificial language intelligence (ALI) is the interface between the data maintenance modules and the processing modules. Its objective lies in making available to the processing modules the cognitive routines required in each case and in coordinating the information exchange with the data maintenance modules. The processing modules can then pose a coded query to the ALI. For example, the code can be made up of a plurality of identification numbers (IDs): the ID of the querying module, the ID of the categories to be processed, the ID of the data maintenance modules posing the query. Advantageously, the code processing (ALIa) takes place first. For example, the combination of the IDs determines the cognitive routines (ALIb) that are to be selected from the pool. The ID of the data maintenance module activates a knowledge query from the world knowledge, situation model, or expert knowledge modules. The extracted knowledge is then advantageously made available in a buffer and is reduced to relevant parts by a subroutine (knowledge focusing, ALIc). Then selected cognitive routines and activated knowledge structures are conveyed to the querying processing module (identified by its ID). The conversion can take place without IDs, the code preferably [having] information regarding the querying module, the categories to be processed, the data maintenance module to be used, and potentially other necessary information. Information from the code determines the routines that can then be transmitted to the appropriate processing module.

The cognitive routines of the artificial language intelligence rely on the simulation of cognitive processes that underlie human language comprehension. It is only possible to describe it verbally to a limited extent. At the current stage of development, CES uses four classes of routines, which can be described in simplified fashion as follows: routines for meaning extraction, for context-bound modification, for context-bound association, and logical processes (inferences).

The concept of meaning extraction, in addition to knowledge access, also includes the linking of concepts and a dynamic assignment of meaning that depends thereon. A dynamic assignment of meaning is absolutely mandatory when working with larger knowledge bases, because in natural language various individual aspects of concepts are relevant depending on the situation. In the context of moving, a grand piano [Flügel] is heavy and unwieldy, but in the context of a concert, its sound is captivating. In the context of airplane construction, a wing [Flügel] is not a musical instrument, but it is also not made of feathers. The dynamic assignment of meaning makes it possible for CES to limit the conceivable multiplicity of meanings of the processed concepts in accordance with the specific context.

The ambiguity of natural language is also taken into account by the routines for context-bound modification. Thus the link "green leaf" permits the assignment of a color, but "green youth" does not.

Context-bound associations lead to temporary connections between conceptual structures. Thus the possession and location of objects can under certain circumstances be associated.

Through inferential logical processes, CES can recognize whether under the existing conditions a statement is logically correct or when specific patterns of events will occur.

The processing of the verbal input begins with the successive processing of the individual words. The extractor, after accessing a language-specific lexicon from the general knowledge base, i.e., the world knowledge module, determines the concepts that correspond to the isolated meaning of the individual words. In an iterative process, the connector links all extracted concepts into one statement. For this linking, the Artificial Language Intelligence (ALI) makes available cognitive routines that are selected as a function of the categories that were determined by the extractor. By integrating all concepts into one statement, the meaning of the verbal message is reconstructed. Concepts for which no linking is accomplished are conveyed to the feedback module. If the connector adds concepts to the original input (see exemplary embodiments), they are also reported to the feedback module. If the quantity of unlinked concepts exceeds a predefined number, then the entire input is evaluated as a meaningless statement. Unfamiliar concepts can be deposited via a learning module in the world knowledge module and then be immediately reprocessed.

Meaningfully reconstructed statements are conveyed by the connector to the conflict module. The conflict module initiates a check of the reconstructed meaning within the current situation context. For this purpose, the conflict module requires special routines of the ALI, which make possible a comparison of the context stored in the situation model with the meaning as reconstructed by the connector. In general, valid statements that can nevertheless not be realized on the basis of the current situation are recognized by the conflict module and are transferred to the feedback module. For controlling downstream installations/robots, control instructions/commands that are not possible are sometimes identified by the conflict module and brought to the attention of the user via the feedback module.

Statements or control instructions that are possible in the current situation context can optionally be subjected to a risk analysis, if expert knowledge is available. Through special routines, this expertise checks whether, in the context of the conflict analysis, hitherto undetected side effects can be derived from the expert knowledge when the reconstructed language statements or control instructions/commands are realized. Recognized dangers are communicated to the user via the feedback module. After expertise has been applied, the reconstructed meaning of the verbal input is realized in the Virtual Realizer. This contains any changes caused by the modifier in the concepts linked in the connector as well as the request from the anticipator for potential subsequent events. Information made available by the modifier and anticipator is integrated in the situation model and assures a current updating of the situation model on an ongoing basis. Anticipated subsequent events are conveyed to the feedback module and, given the appropriate activation, are stored by the user as input for a new processing cascade. Anticipated consequences of an original statement or control command can best be checked by CES over the course of a multiplicity of subsequent events.

Conflicts that arise during the analysis, or additional requirements for knowledge, are announced to the user through the feedback module and, if necessary, inputs are requested. The depth of the report can be selected.

Once the processing of the verbal input is completed, its meaning can be converted by the command generator into control commands for the downstream technical installation. The command generator as the interface to a third-party system is adjusted in a user-specific manner. In this context, the meaning of the technical commands and system conditions is coded using the same conceptual structures that CES uses for grasping the meaning of the verbal input. The processing sequence that results language>language meaning>command meaning> technical control
clarifies the intimate interpenetration between the meaning of the verbal instruction and the meaning of the control command. The verbal instruction of the user, on the one hand, and the language processing and control by CES, on the other hand, rely on an identical conceptual logic. The system "thinks like a human," as a result of which communications misunderstandings (such as by an incorrect understanding of keywords by the user) are avoided.

Thus the present invention makes possible an interface between human and machine that can convey the human instructions in their meanings to a machine, whether the latter is an entire factory, an air control system, are simply a computer, so that the machine is afforded the capability of comprehending instructions and the like in their meanings, i.e., in their reciprocal relationships with the current situation, and of realizing them appropriately. In this manner, the present invention creates an immediate link between human and machine that operates without other external influences.

APPLICATION EXAMPLE

Dialog Creation in the Example of a Search Engine

Through ascertaining meaning, it is possible to recognize online user intentions.

Example

An Input in a Search Engine

"carp pike trout herring"
The meaning of the isolated concepts and their category assignment is extracted and is transmitted to the connector. The connector attempts to meaningfully link all concepts. A request code is transmitted to the Artificial Language Intelligence. ALIa analyzes the code and recognizes that all the concepts belong to the category "objects." From the pool of cognitive routines (ALIb), a suitable linking routine is conveyed to the connector. In the specific case, ALIb selects the routine to locate commonalities, which leads to the result "edible fish." The connector adds the located concept and conveys the following reconstructed meaning: "edible fish: carp, pike, trout, herring." Because the original input was expanded by the connector to include "edible fish," the feedback module is started, and the query "Search for edible fish?" is initiated. Upon confirmation, the command generator will initiate a search in the attached database for the keywords "edible fish" and will list the hits with respect to carp, pike, herring, or trout having the highest relevance. If the user indicates the negative, then the original input is used (here, for reasons of simplicity, the function of the other processing modules is ignored and is treated in the following application example).

If the user makes additional inputs, CES will try to meaningfully link them with the previous ones (exception: "new search" option).

Further Examples

"Pike" and "spinner" [Blinker] initiates a query "Search for fishing equipment?"
"Auto" and "blinker" [Blinker] initiates a query "Search for auto parts?"
"Guppy" and "goldfish" initiates a query "Search for ornamental fish dealer?"
"Guppy" and "hamster" initiates a query "Search for animal dealer?"

At the current state of the art, similar capabilities can be achieved by a search engine only if the queried databases have available to them structured catalogs. The latter require great effort to set up and must be compatible with the query. Thus the user intentions must be known a priori when the catalog is set up. On the other hand, CES infers the intentions of the user online from the meaning of the queries and reformulates the query accordingly, if necessary. Search engines that are equipped with CES can therefore better take account of user intentions and also access unstructured databases.

Application Example

Improvement of Voice Recognition by the Identification of Meaningless and Logically False Statements Due to environmental noises or unclear articulation, acoustical voice recognizers cannot identify individual words 100% correctly. In this case, possible alternatives are activated. In text inputs, similar problems arise through typing errors. Even the newly developed technology of handwritten inputs using a digitizer (a special pen having an electromagnetic tip) on a tablet PC or laptop comes to grief in the relatively high error rate in word recognition. In our example, the word "cup" [Tasse] is falsely recognized, i.e., written, as "cashier" [Kasse] or "pocket" [Tasche]. CES is capable of recognizing and correcting errors of this type on the basis of the meaning context.

Input: "Hanna is making a cashier [Kasse]/cup [Tasse]/pocket [Tasche] of coffee."

Via the lexicon, the extractor accesses the world knowledge module. The meaning of individual concepts is extracted, their category assignment is determined, and the information is conveyed to the connector. In an iterative process, the connector attempts to meaningfully link all the concepts in succession. First, the connector transmits a request code to the Artificial Language Intelligence (ALI). ALIa based on the code recognizes the requesting module and the categories that are to be processed. From the pool of cognitive routines (ALIb), a suitable linking routine is selected and is conveyed to the connector. In the present example, a meaningful connection is generated only by excluding the concepts "pocket" [Tasche] and "cashier" [Kasse]. These isolated concepts are conveyed to the conflict module along with the reconstructed meaning of the input, "Hanna is making a cup of coffee." The presence of unbound concepts is recognized as a conflict, and the feedback module is started. If the feedback threshold is set at a low level, a notification is generated for the user ("On the basis of the existing knowledge base, no reference to "pocket" [Tasche] and "cashier" [Kasse] can be established. Should the statement "Hanna is drinking a cup of coffee" be accepted?). If the feedback threshold is high, the reconstructed meaning is accepted and the concepts "cashier" [Kasse] and "pocket" [Tasche] are excluded from further processing without acknowledgment.

Application Example

Conflict Analysis as a Means for the Automatic, Temporary, Situation-Dependent Blocking of Verbally Provided Control Instructions The conflict analysis module checks to determine whether the reconstructed meaning of a statement is appropriate to the current situation context. The current situation context is stored in the situation model. If no stored situation has been loaded prior to the first input, then the situation model is empty.

Input 1: "Hanna's coffee machine is broken."

Via the lexicon, the extractor accesses the world knowledge module. The meaning of the individual concepts is extracted, their category assignment is determined, and the information is conveyed to the connector. Because, in contrast to the first application example, other categories are contained in this statement, the connector transmits a different code. Accordingly, ALI in addition to the linking routines now makes available two other cognitive routines: one for the context-dependent modification and one for association.

In contrast to the previous example, here the linking of all participating concepts is successful; this can be represented schematically in the following manner:

"Coffee machine→Hanna; broken→coffee machine."

In the conflict analysis, no unbound concepts are located, and the feedback module is not activated. The conflict analysis sends a code to ALIa, which initiates a query of the situation model. ALIc cannot make any information available: the situation model is still empty (this is still the first input). Because there is no information to process, there is no need to make available a cognitive routine via ALIb. With the return of a zero information from ALI, the conflict analysis is terminated. If the result of the subsequent expertise is also zero (the assumed case), then the Virtual Realizer takes over. The modifier leads the cognitive routines made available by ALI to the association module (coffee machine→Hanna) and modification module (broken→coffee machine), and it conveys the result to the situation model. The anticipator delivers zero. If no technical system is connected (the assumed case), then the analysis of the first input is terminated.

Input 2: "Hanna is making a cup of coffee using her coffee machine."

At first, the analysis proceeds without difficulty as described. The connector links all the concepts successfully into one meaningful connection:

"Coffee machine→Hanna; make→Hanna→coffee→cup→coffee machine"

and conveys it to the conflict analysis. The conflict analysis transmits to the Artificial Language Intelligence a code, which, inter alia, contains information regarding the categories to be analyzed and the querying module. In accordance with the code analyzed by ALIa, ALIc initiates a search in the situation model. ALIc extracts from the situation model any information that corresponds to the categories specified in the code. Because ALIc makes information available, cognitive routines are selected by ALIb that correspond to the above-mentioned code. After the knowledge focusing process is completed, the cognitive routines and information extracted from the situation model are conveyed to the conflict analysis module. Using the routines that are made available, the conflict analysis module executes procedures that lead to the following results:

| | | |
|---|---|---|
| a). | Match: | coffee machine → Hanna (input 2) is identical with coffee machine → Hanna (situation model) |
| b) | Inference: | coffee machine → Hanna (situation model) is broken coffee machine → Hanna (input 2) is broken |
| c). | Conflict: | make → coffee → coffee machine←broken. |

The discovered conflict activates the feedback module. If the feedback threshold is set at a low level, then the following notification is sent to the user:

"The input "Hanna is making a cup of coffee using her coffee machine" is in conflict with the current situation because the coffee machine is broken. Should the input be realized anyway?"

When the feedback threshold is set at a high level, the statement is rejected without comment. In the case of downstream technical systems, control commands that are in conflict with the current situation are blocked. Because data regarding the current system condition can also be stored in the situation model, it is possible to temporarily block control interventions in a situation-dependent manner.

In the current state of the art, the attempt is made to recognize meaningful connections between the words of a statement using statistical methods. However, meaningless statements cannot be recognized in this way—distinguishing them from unlearned word combinations is problematic. Also, it is not possible with sufficient clarity to recognize situation-dependent conflicts, either using statistical methods or with the aid of so-called neural networks.

The ascertainment of meaning by CES does not rely on the learning of transition probabilities. CES can process any combinations of all concepts contained in the knowledge base, because the reconstruction of meaning online is accomplished using cognitive routines. In the first example above, if meaningful associations are possible in other content-based contexts between "coffee" [Kaffee] and "pocket" [Tasche] or "cashier" [Kasse], then they are reconstructed by CES. Thus it would be possible, e.g., for Hanna to pay for a cup of coffee at the cashier. Under certain circumstances, Hannah can even pour the coffee into her pocket. This leads to a further application example.

Application Example

Function of Expertise as an Additional Security Feature in the Analysis of Information that is Provided Verbally Input: "Hanna is pouring coffee into the pocket."

Initially, the analysis follows the already described sequence—with the assistance of the routines made available by ALI, the connector succeeds in linking all the concepts into one meaningful connection. After the conflict analysis (in the assumed case, the result is zero), the expertise begins with the transmission of an appropriate code to ALIa. Because the query is coming from the expertise, ALIa initiates a search in the expert knowledge module. ALIc extracts from the expert knowledge the information that corresponds to the categories specified in the code. Because ALIc is making information available, ALIb selects a cognitive routine that corresponds to the above-mentioned code. This cognitive routine together with the information extracted from the expert knowledge is transmitted to the expertise. The routine made available to the expertise executes procedures that lead to the following results:

| | | |
|---|---|---|
| a). | Analysis: | in the situation context, coffee = liquid in the situation context, coffee → location pocket |
| b). | Inference: | liquid → location pocket |
| c). | Expertise: | pocket # container for liquid |
| d). | Conflict: | location pocket → coffee |

The discovered conflict activates the feedback module. If the feedback threshold is set at a low level, the following announcement is sent to the user:

"According to the available expert knowledge, pocket is inappropriate. Should the input "Hanna is pouring coffee in the pocket" be realized anyway?"

If the feedback threshold is set at a high level, the statement is rejected without comment, or in the case of a command (e.g., to a robot: "pour the coffee in the pocket"), the execution is blocked.

Application Example

Function of the Virtual Realizer. Predictive Risk Analysis

What follows is a further analysis of the input: "Hanna is pouring coffee in the pocket."

If, despite the warning by the expertise, the user insists on realizing the input, the Virtual Realize takes over. The modifier establishes any changes that are connected with the reconstructed statement and transmits them to the situation model. The anticipator operates on the basis of the principle that was already described with regard to the other modules: by transmitting a code to ALIa, the appropriate cognitive routines are made available by ALIb. Because the query comes from the anticipator, ALI applies these routines to the world knowledge module. A check is carried out as to whether links to subsequent events are yielded for the reconstructed meaning in the world knowledge. If the search is successful, the located link is transmitted to the feedback module:

"The input "Hanna is pouring coffee in the pocket" can be linked with 'run out.' Analyze the link?"

If the user agrees, then "run out" is transmitted to the extractor. CES will then generate the meaningful statement:

"The coffee is running out of the pocket."
and will thus warn the user regarding potential dangers that can occur as a result of the first statement:

"Hanna is pouring coffee in the pocket."

CES is capable of undertaking much more precise danger assessments. The consequences of an instruction, e.g., "Pour acid (concrete specification) into the container (concrete specification)," if there is sufficient expert knowledge, can lead to precise predictions as to whether the acid will shatter the container and run out, and which potential dangers in the environment can occur (assuming a detailed situation model). Before the activation of the command generator, it is thus possible, if necessary, to run through multiple processing cycles in order to assess the potential consequences of verbal instructions.

Application Example

Function of the Anticipator in the Context-Bound Removal of Ambiguity

The context-bound removal of ambiguity by the Virtual Realizer is also made clear in the links that are proposed by the anticipator:

| Input "let fall towel" | → proposed link: none |
|---|---|
| Input "let fall glass" | → proposed link: "smash" |
| Input "let fall word" | → proposed link: "speak." |

Application Example

Function of the Modifier in the Context-Bound Removal of Ambiguity

The context-bound removal of ambiguity in concepts having the identical spoken sounds (here, "climbs") leads to consequences that may not immediately be visible to the user on the surface. Thus, in the following examples, in each case a qualitatively different modification takes place in the situation model:

Input "The share price has climbed by 3%."
Situation model: Modification value of the shares→+3%.
Input "Hanna is entering the train."
Situation model: modification location Hanna→train.

Application Example

Use of CES for the Voice Control of a Mobile Office Robot with the Capability of Navigation and the Recognition of Persons In the current state of the art, voice control takes place through isolated keywords, i.e., their sound. In response to the inputs "Robby bring me coffee"
"Robby bring me the mail"

the robot is activated by the keyword "Robby," and he expects a navigation instruction. "Coffee" activates the programmed location "coffee machine,"

"Mail" activates the preestablished location "mail room." The robot navigates towards the location that is fixedly linked to the specific keyword and then moves back to the speaker. The other words of the input are ignored.

Therefore, inputs such as

"Robby swim in the coffee" or "Robby put postage on my mail"

also lead to the result of fetching.

Keyword controls are inappropriate as soon as the robot is capable of executing actions other than fetching. But even relatively simple fetching instructions such as "Robby bring Hanna coffee in the laboratory" can no longer be realized without a comprehension component. The following exemplary embodiment demonstrates the advantages of a robot control using CES that is based on ascertaining the meaning. Prior settings of the aforementioned kind (e.g., location coffee machine) are stored in the expert knowledge.

Input: "Robby bring me coffee."

The processing of the verbal input follows the already described course. The extractor conveys to the connector the category and meaning of the individual words. The Artificial Language Intelligence makes available to the connector the appropriate linking routines. All concepts can be successfully linked, and the conflict analysis does not yield any conflicts. The expertise for the input "Robby bring me coffee" receives the following reconstructed meaning:

"Robby→location coffee {0}→location receiver {0}."

Because "Robby" was recognized as the actor, the expertise first checks to see whether the instruction is an action that is input (i.e., permitted) for the robot. If this is not the case, then a report is sent to the user: "Robby cannot execute the instruction." In the present case, ALIc finds for the action "Robby→fetch coffee" the preset location coffee {coffee machine} and location receiver {speaker}. The expertise fills the blanks "Location coffee {0}" with the presetting "location coffee {coffee machine}"

"Location receiver {0}" with "location receiver {speaker}."

However, the corresponding blanks may have already been defined by the verbal inputs. The input "Robby bring me coffee from the kitchen" is interpreted as follows:

"Robby→location coffee {kitchen}→location receiver {0}."

In this case, the presetting "coffee machine" is ignored.

The meaning of the input, which has been completed by the expertise, is transmitted to the Virtual Realizer. At the same time, a code is transmitted that indicates that it is a question of an instruction for the associated technical system (the robot, "Robby"). Since no subsequent events are anticipated by the Virtual Analyzer, the reconstructed meaning is transmitted to the command generator. As it is not difficult to recognize, the located interpretation of the verbal input, "Robby→location coffee {kitchen}→location receiver {speaker},"

already corresponds to an executable command sequence, which can be realized via the command generator in connection with a specific database.

If equipped with CES, robots can be created that "think along with you," as the following situation makes clear. Assume that this statement is encountered in a conversation—"Hanna is in the laboratory." In the situation model of the responding robot, CES undertakes the modification "location Hanna→laboratory." In a subsequent verbal input, "Robby bring Hanna coffee," the blank contained in the instruction "location Hanna {0}" is completed by the entry contained in the situation model "location Hanna→laboratory." The robot navigates independently to the correct location.

Application Example

Use of CES for the Automatic Ascertainment of the Meaning of Language Instructions in Air Traffic The patent DE 694 13 031 T2 describes a method for the automatic interpretation of flight safety instructions, which are based on a syntactic analysis and the search for individual, previously established keywords. In contrast, the present invention makes it possible to reconstruct the meaning even of verbal instructions that are syntactically/grammatically false. Furthermore, the present invention makes possible an automatic comparison of the verbally supplied instructions with the resulting, or executed, actions/control interventions. Conflicts that arise can automatically be detected and reported. In the following application example, CES is running in the background in order to analyze the radio contact between the tower and an airplane.

Tower: "D IL taxi to holding-position A2 runway 32."

The verbal input is processed in accordance with the procedure described above. The extractor conveys to the connector the category and meaning of the individual words. The artificial language intelligence makes available to the connector the appropriate linking routines. All concepts can be successfully linked. The following meaning is transmitted to the conflict analysis module:

"D IL→location {current}→location {A2}."

In the context of the conflict analysis, a check is carried out as to whether, in the situation model, holding-position A2 is free. If this is not the case, the recognized conflict is reported via the feedback module: "Instruction cannot be executed in the current context. A2 is occupied by D IK."

It is assumed that airplane D IL will subsequently transmit the following report to the tower:

"D IL holding-position A2, runway 32 right, ready to take off."

The processing of the verbal input follows the procedure described above; in the Virtual Realization, the anticipator recognizes the link to the possible subsequent event, "start." An automatic processing of the (anticipated) input "D IL holding-position A2, runway 32 right, Start"

is initiated and follows the course described above. If, in the expert knowledge module, it has been defined that a start can only take place after a start release has been provided by the Tower (the assumed case), then further processing is blocked until the reception of the verbal instruction from the tower "D IL Start free . . . ."

The input "D IL holding-position A2, runway 32 right, Start" is only transmitted to the command generator after the start release, i.e., the control interventions on the airplane that are linked to the start procedure are not accepted by the command generator, or at least (in the case of a mandatory emergency start) the following announcement is transmitted to the pilot by CES over the feedback module:

"Start release "D IL holding-position A2, runway 32 right, Start" has not been issued."

As it is not difficult for a person skilled in the art to recognize, as a result of the automatic ascertainment of the meaning of verbal instructions in air traffic, the present invention makes it possible to provide other safety references/warnings, depending on the detailed configuration of the expert knowledge, command generator, and situation model.

KEY TO FIGURES

Figure 2:
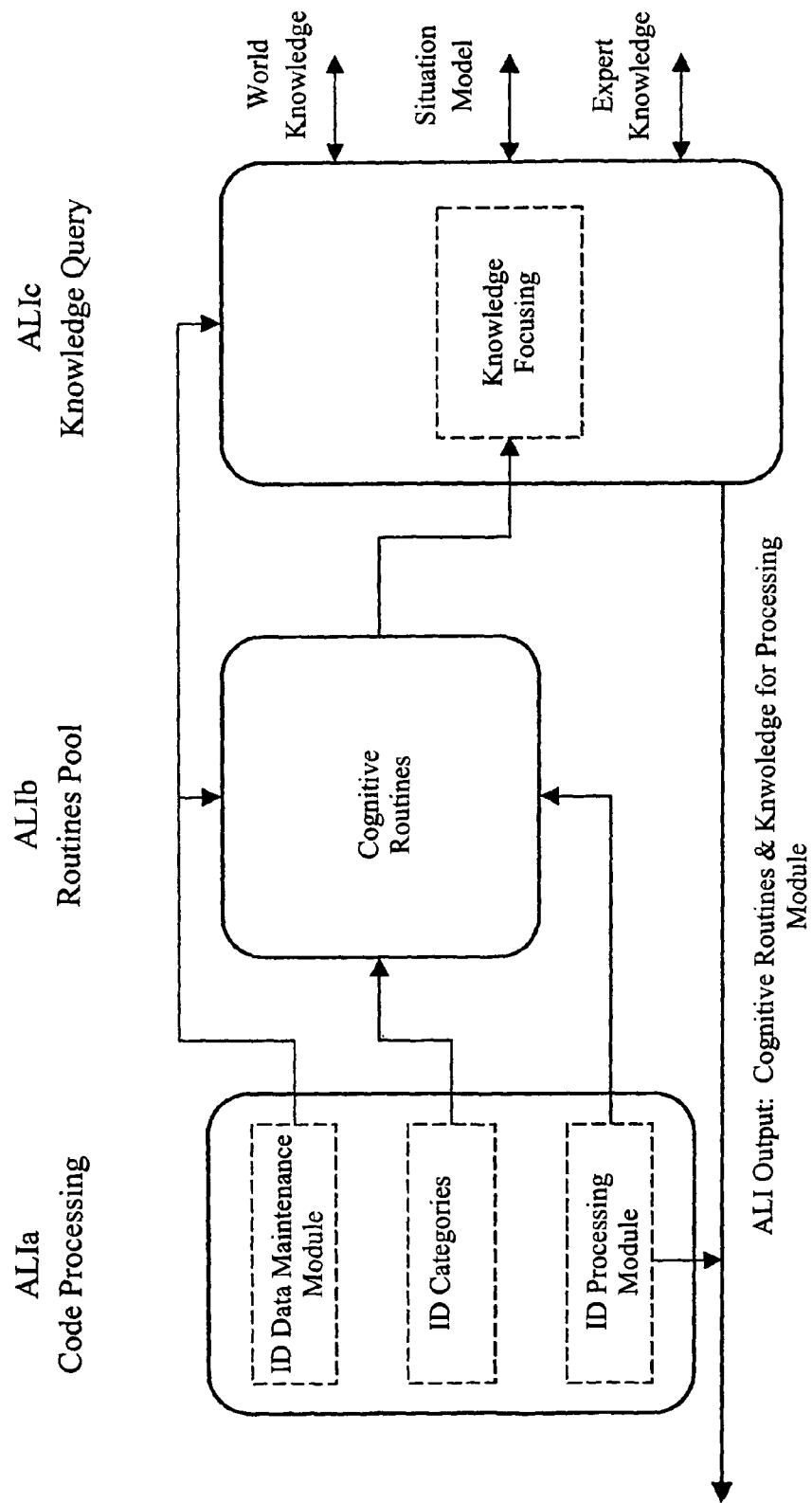
FIG. 2 is a diagram of cognitive routines and knowledge for a Processing Module in an embodiment of the invention.

FIG. 1
Feedback—feedback
Lernmodul—learning module
Extractor—extractor
Konnektor—connector
Konfliktanalyse—conflict analysis
Expertise—expertise
Virtueller Realizer—virtual realizer
Kommandogenerator—command generator
Lexikon—lexikon
Künstliche Sprachintelligenz (KSI)—Artifical Language Intelligence (ALI)
Modifikator—modifier
Antizipator—anticipator
Weltwissen—world knowledge
Situationsmodell—situation model
Expertenwissen—expert knowledge
FIG. 2
KSIa Kodenverarbeitung—ALIa code processing
KSIb Routinen-Pool—ALIb routines pool
KSIc Wissensabfrage—ALIc knowledge query
ID Datenh. Modul—ID data maintenance module
ID Begriffsklassen—ID categories
ID Verarb. Modul—ID processing module
Kognitive Routinen—cognitive routines
Wissensfokussierung—knowledge focussing
Weltwissen—world knowledge
Situationsmodell—situation model
Expertenwissen—expert knowledge
KSI Output: Kognitive Routinen & Wissen zum Verarbeitungsmodul—ALI Output: cognitive routines & knowledge for processing module

The invention claimed is:

1. A system for automatically recognizing and further processing meaning of a linguistically provided information, comprising: a processor executing routines providing:
    an extractor which extracts a concept and a concept category from a knowledge base for each word contained in said linguistically provided information, each extracted concept corresponding to isolated meaning of one of the words; and
    a connector which connects the extracted concepts to obtain a reconstructed meaning of said linguistically provided information;
    wherein:
    an artificial language intelligence coordinates an information exchange between the connector and the knowledge base, which contains a pool of cognitive routines;
    the connector first transmits a request code to the artificial language intelligence, the request code containing at least information regarding the connector and the extracted concept categories to be processed;
    the artificial language intelligence subsequently processes the request code, thereby selecting a cognitive connection routine from the pool of cognitive routines, said cognitive connection routine determined by the combination of information contained in the request code, extracts information from the knowledge base in consideration of the extracted concept categories to be processed, and transmits the cognitive connection routine and the information extracted from the knowledge base to the connector; and
    the connector connects the extracted concepts in consideration of said cognitive connection routine and said information extracted from the knowledge base, following which a meaningfully reconstructed meaning of said linguistically provided information is conveyed to a conflict module, the conflict module compares the reconstructed meaning of said information with a current situation context contained in a situation module, which is part of the knowledge base, by using an appropriate comparison routine, by the following process: the conflict module first transmits a request code to the artificial language intelligence, the request code containing at least information regarding the conflict module, the extracted concept categories to be processed and the situation module; the artificial language intelligence subsequently processes the request code, thereby selecting a cognitive comparison routine from the pool of cognitive routines, said cognitive comparison routine determined by the combination of information contained in the request code, extracts information from the situation module in consideration of the extracted concept categories to be processed; transmits the cognitive comparison routine and the information extracted from the situation module to the conflict module; and the conflict module compares the reconstructed meaning of said linguistically provided information with said information extracted from the situation module in consideration of said cognitive comparison routine.

2. The system according to claim 1, comprising a feedback module, wherein concepts for which no linking is accomplished are conveyed to the feedback module, which brings them to the attention of a user of the system.

3. The system according to claim 1, comprising a feedback module, wherein concepts which are contained in said information extracted from the knowledge base and which are added to the linguistically provided information by the connector, are conveyed to the feedback module which brings them to the attention of a user of the system.

4. The system according to claim 2, wherein the feedback module initiates a query after receiving said unlinkable or added concepts.

5. The system according to claim 3, wherein the feedback module initiates a query after receiving said unlinkable or added concepts.

6. The system according to claim 2, wherein the linguistically provided information is evaluated as a meaningless statement if the quantity of unlinked concepts exceeds a predefined number.

7. The system according to claim 1 wherein unfamiliar concepts are deposited via a learning module in the knowledge base.

8. The system according to claim 1, comprising a feedback module, wherein a valid reconstructed meaning of said linguistically provided information that can nevertheless not be realized on the basis of the current situation is recognized by the conflict module and is transferred to the feedback module which brings it to the attention of a user of the system.

9. The system according to claim 1, comprising a feedback module, wherein a valid reconstructed meaning of said linguistically provided information that can nevertheless not be realized on the basis of the current situation is recognized by the conflict module and is transferred to the feedback module which brings it to the attention of a user of the system.

10. The system according to claim 1, wherein a meaning of said linguistically provided information, which is possible in the current situation context, is subjected to a risk analysis by an expertise module, wherein the expertise module compares the reconstructed meaning of said linguistically provided information with expert knowledge contained in a expert knowledge module, which is part of the knowledge base, by using an appropriate comparison routine.

11. The system according to claim 1, wherein a meaning of said linguistically provided information, which is possible in the current situation context, is subjected to a risk analysis by an expertise module, wherein the expertise module compares the reconstructed meaning of said linguistically provided information with expert knowledge contained in a expert knowledge module, which is part of the knowledge base, by using an appropriate comparison routine.

12. The system according to claim 10, wherein:
    the expertise module first transmits a request code to the artificial language intelligence, the request code containing at least information regarding the expertise module, the extracted concept categories to be processed and the expert knowledge module;
    the artificial language intelligence subsequently processes the request code, thereby selecting a cognitive comparison routine from the pool of cognitive routines, said cognitive comparison routine determined by the combination of information contained in the request code, extracts information from the expert knowledge module in consideration of the extracted concept categories to be processed, and transmits the cognitive comparison routine and the information extracted from the expert knowledge module to the expertise module; and
    the expertise module compares the reconstructed meaning of said linguistically provided information with said information extracted from the expert knowledge module in consideration of said cognitive comparison routine.

13. The system according to claim 11, wherein:
    the expertise module first transmits a request code to the artificial language intelligence, the request code containing at least information regarding the expertise module, the extracted concept categories to be processed and the expert knowledge module;

the artificial language intelligence subsequently processes the request code, thereby selecting a cognitive comparison routine from the pool of cognitive routines, said cognitive comparison routine determined by the combination of information contained in the request code, extracts information from the expert knowledge module in consideration of the extracted concept categories to be processed, and transmits the cognitive comparison routine and the information extracted from the expert knowledge module to the expertise module; and the expertise module compares the reconstructed meaning of said linguistically provided information with said information extracted from the expert knowledge module in consideration of said cognitive comparison routine.

14. The system according to claim 12, comprising a feedback module, wherein a valid reconstructed meaning of said linguistically provided information that can nevertheless not be realized on the basis of the information extracted from the expert knowledge module are recognized by the expertise module and are transferred to the feedback module which brings them to the attention of a user of the system.

15. The system according to claim 13, wherein a valid reconstructed meaning of said linguistically provided information is processed via a virtual realization module.

16. The system according to claim 15, the virtual realization module comprising a modification module which establishes any changes that are connected with the reconstructed meaning of said linguistically provided information and transmits them to the situation module for updating the latter in an ongoing manner.

17. The system according to claim 15, the virtual realization module comprising an anticipation module, wherein the anticipation module anticipates consequences of actions and events contained in the reconstructed meaning of said linguistically provided information in consideration of world knowledge contained in a world knowledge module, which is part of the knowledge base, by using an appropriate anticipation routine.

18. The system according to claim 17, wherein:

the anticipation module first transmits a request code to the artificial language intelligence, the request code containing at least information regarding the anticipation module, the extracted concept categories to be processed and the world knowledge module;

the artificial language intelligence subsequently processes the request code, thereby selecting a cognitive anticipation routine from the pool of cognitive routines, said cognitive anticipation routine is determined by the combination of information contained in the request code, extracts potential links to subsequent events for the reconstructed meaning of said linguistically provided information from the world knowledge module, and transmits the cognitive anticipation routine and, if the search is successful, the located links to the anticipation module; and the anticipation module connects the reconstructed meaning of said linguistically provided information with said links extracted from the world knowledge module in the context-bound manner, by using said cognitive anticipation routine.

19. The system according to claim 17, comprising a feedback module, wherein anticipated subsequent events are conveyed to the feedback module, which brings them to the attention of a user of the system.

20. The system according to claim 18, wherein information made 5 available by the anticipation module is integrated in the situation model contained in the situation module assuring a current updating of the situation model on an ongoing basis.

21. The system according to claim 17, wherein the anticipated events are virtually realized by the virtual realization module, wherein:

the virtual realization module first transmits a request code to the artificial language intelligence, the request code containing at least information regarding the virtual realization module, the extracted concept categories to be processed and the world knowledge module;

the artificial language intelligence subsequently processes the request code, thereby selecting a cognitive virtual realization routine from the pool of cognitive routines, said cognitive virtual realization routine is determined by the combination of information contained in the request code, extracts information from the world knowledge module in consideration of the extracted concept categories to be processed, and transmits the cognitive virtual realization routine and the information extracted from the world knowledge module to the virtual realization module; and the virtual realization module virtually realizes the reconstructed meaning of said linguistically provided information in consideration of said cognitive processing routine and said information extracted from the world knowledge module.

22. The system according to claim 15, comprising a command generation module, wherein the reconstructed meaning of said linguistically provided information, after undergoing the virtual realization, is converted by the command generation module into control commands for a downstream technical installation or robot.

23. The system according to claim 1, wherein the extractor reduces the linguistically provided information to basic forms.

24. The system according to claim 1, comprising special slots for implementing user-specific expert knowledge, wherein the meaning of a new linguistically provided information is first reconstructed, is then compared with the content of the existing knowledge base, and finally a relevance evaluation is derived by an intelligence module on basis of the expert knowledge in accordance with user-specific criteria.

25. The system according to claim 1, wherein extracted knowledge from the knowledge base is made available in a buffer and is reduced to relevant parts by subroutine.

* * * * *